US012212219B2

(12) United States Patent
Tang et al.

(10) Patent No.: US 12,212,219 B2
(45) Date of Patent: Jan. 28, 2025

(54) ELECTRIC MACHINE COOLING

(71) Applicant: Honeywell International Inc., Charlotte, NC (US)

(72) Inventors: Benjamin Tang, Monterey Park, CA (US); Ami Bhavsar, Hermosa Beach, CA (US); Michael Leighty, Westminster, CA (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/650,063

(22) Filed: Feb. 4, 2022

(65) Prior Publication Data

US 2023/0010555 A1   Jan. 12, 2023

Related U.S. Application Data (60) Provisional application No. 63/219,761, filed on Jul. 8, 2021.

(51) Int. Cl.
  *H02K 9/22*  (2006.01)
  *H02K 9/06*  (2006.01)
  *H02K 9/20*  (2006.01)

(52) U.S. Cl.
  CPC ............. *H02K 9/225* (2021.01); *H02K 9/06* (2013.01); *H02K 9/20* (2013.01)

(58) Field of Classification Search
  CPC ............ H02K 9/225; H02K 9/06; H02K 9/20; H02K 5/128; H02K 5/20; H02K 5/203; H02K 7/14; H02K 9/197
  See application file for complete search history.

(56) References Cited

U.S. PATENT DOCUMENTS 3,089,969 A * 5/1963 Wiedemann ........... H02K 9/197
                                                310/58
4,404,055 A * 9/1983 McCarty ................ H02K 15/12
                                                156/289

(Continued)

FOREIGN PATENT DOCUMENTS

| CN | 102097907 B | 3/2013 |
| CN | 112412780 A | 2/2021 |

(Continued)

OTHER PUBLICATIONS

English translation of KR-2021-065676-A (Year: 2021).*

(Continued)

*Primary Examiner* — Tulsidas C Patel
*Assistant Examiner* — Joshua Kiel M Rodriguez
(74) *Attorney, Agent, or Firm* — Shumaker & Sieffert, P.A.

(57) ABSTRACT

A rotary mechanical system includes an electric machine, such as an electric motor, and a housing at least partially housing one or more components of the electric machine. The housing defines an electrical cavity and a coolant cavity. The electrical cavity houses one or more electrical components, such as a stator, of the electric machine. The coolant cavity is configured to receive a liquid coolant, such as ethylene glycol and water, from a liquid coolant system. The housing is configured to seal a two-phase refrigerant within the electrical cavity to transfer heat from the one or more electrical components to a wall of the electrical cavity and from the wall of the electrical cavity to the liquid coolant.

15 Claims, 4 Drawing Sheets

(56) References Cited

U.S. PATENT DOCUMENTS

| | | | |
|---|---|---|---|
| 6,515,383 | B1 | 2/2003 | Ognibene et al. |
| 7,443,062 | B2 | 10/2008 | Dong et al. |
| 7,633,193 | B2 | 12/2009 | Masoudipour et al. |
| 8,169,110 | B2 | 5/2012 | Swales et al. |
| 8,581,455 | B2 | 11/2013 | Woolmer |
| 9,395,111 | B2 | 7/2016 | Sommer et al. |
| 10,305,352 | B2 | 5/2019 | Dhawan |
| 2005/0194847 | A1 | 9/2005 | Gromoll et al. |
| 2006/0017335 | A1 | 1/2006 | Matin et al. |
| 2008/0273990 | A1 | 11/2008 | Pham et al. |
| 2009/0206687 | A1* | 8/2009 | Woody ............... H02K 9/20 62/99 |
| 2011/0008184 | A1* | 1/2011 | De Boer ........... F04D 25/0686 417/423.8 |
| 2015/0207388 | A1 | 7/2015 | Sugimoto et al. |
| 2015/0280526 | A1 | 10/2015 | Chamberlin et al. |
| 2017/0029679 | A1 | 2/2017 | Van Horn et al. |

FOREIGN PATENT DOCUMENTS

| | | | | |
|---|---|---|---|---|
| CN | 112491206 | A | | 3/2021 |
| EP | 1947757 | A2 | | 7/2008 |
| JP | H10336968 | A | | 12/1998 |
| JP | 2011254570 | A | | 12/2011 |
| JP | 2021057995 | A | | 4/2021 |
| KR | 20190087708 | A | * 7/2019 | ............ H02K 5/20 |
| KR | 2019093796 | A | * 8/2019 | ............ B60L 58/26 |
| KR | 2021065676 | A | * 6/2021 | |
| KR | 20210065676 | A | | 6/2021 |
| WO | 0237648 | A1 | | 5/2002 |
| WO | 2020077778 | A1 | | 4/2020 |

OTHER PUBLICATIONS

English translation of KR-2019-093796-A (Year: 2019).*
Honeywell, "A Better Environment with Next-Generation Solstice zd Refrigerant," 2018. (Year: 2018).*
English translation of KR-20190087708-A (Year: 2019).*
Response to Extended Search Report dated Nov. 25, 2022, from counterpart European Application No. 22180795.1 filed Jan. 17, 2023, 32 pp.
U.S. Appl. No. 17/810,997, filed Jul. 6, 2022, naming inventors Tang et al.
Fujita et al., "Newly Developed Motor Cooling Method Using Refrigerant," MDPI, World Electric Vehicle Journal, vol. 10, No. 38, doi: 10.3390/wevj10020038, Jun. 4, 2019, 10 pp.
Gronwald et al., "Traction motor cooling systems, a literature review and comparative study," IEEE, Transactions on Transportation Electrification, DOI 10.1109/TTE.2021.3075844, downloaded Apr. 28, 2021, 21 pp.
Extended Search Report from counterpart European Application No. 22180795.1 dated Nov. 25, 2022, 8 pp.
Office Action from U.S. Appl. No. 17/810,997 dated Jul. 5, 2023, 15 pp.
Advisory Action from U.S. Appl. No. 17/810,997 dated Feb. 5, 2024, 3 pp.
Final Office Action from U.S. Appl. No. 17/810,997 dated Nov. 17, 2023, 19 pp.
Response to Final Office Action dated Nov. 17, 2023 from U.S. Appl. No. 17/810,997, filed Jan. 17, 2024, 8 pp.
Notice of Allowance from U.S. Appl. No. 17/810,997 dated Apr. 11, 2024, 11 pp.

* cited by examiner

ELECTRIC MACHINE COOLING

This application claims the benefit of U.S. Provisional application No. 63/219,761, entitled "ELECTRIC MACHINE COOLING" and filed on Jul. 8, 2021, which is incorporated herein by reference in its entirety.

TECHNICAL FIELD

The present disclosure relates to systems and techniques for cooling electric machines.

BACKGROUND

Rotating electric machines may use electromagnetic forces to convert electrical energy into mechanical energy (e.g., an electric motor) or mechanical energy into electrical energy (e.g., an electric generator). For example, an alternating current (AC) electric motor converts alternating current into mechanical energy to drive an output shaft. The electric motor includes a stator that produces a rotating magnetic field from the alternating current that generates torque on a rotor attached to the output shaft. A component or system that includes an AC electric motor may use mechanical energy from the output shaft to power one or more components, such as a propulsor or impeller.

SUMMARY

In general, the disclosure describes techniques for cooling an electric machine. A rotary mechanical system, such as a compressor, includes an electric machine, such as an electric motor, and a housing that houses various components of the electric machine, such as a rotor in a rotor cavity and a stator in a stator cavity. To cool electrical components within the housing, such as the stator, the housing includes a liquid coolant circulated through the housing and a refrigerant sealed within the housing. A portion of the heat generated by electrical components may transfer to the housing through thermal conduction, such as from portions of electrical components attached to the housing. Another portion of the heat generated from electrical components may transfer to the housing by the refrigerant, such as through convection of a liquid phase of the refrigerant or through evaporation and subsequent condensation of a vapor phase of the refrigerant against the wall of the housing or another cool surface coupled to the housing. The liquid coolant removes heat from the housing. In this way, rotary mechanical systems described herein may have increased heat transfer to the liquid cooling system, permitting higher power density in the electric machine and lower operating temperature.

In some examples, the disclosure describes a rotary mechanical system that includes an electric machine and a housing at least partially enclosing one or more components of the electric machine. The housing defines at least one electrical cavity housing one or more electrical components and a coolant cavity configured to receive a liquid coolant from a liquid coolant system. The housing is configured to seal a two-phase refrigerant within the electrical cavity.

In some examples, the disclosure describes a mechanical and cooling system that includes a rotary mechanical system and a liquid cooling system. The rotary mechanical system includes an electric machine and a housing at least partially enclosing one or more components of the electric machine. The housing defines at least one electrical cavity housing one or more electrical components and a coolant cavity configured to receive a liquid coolant from a liquid coolant system. The housing includes a two-phase refrigerant sealed within the electrical cavity. The liquid cooling system is fluidically coupled to the coolant cavity and configured to supply a liquid coolant, such as ethylene glycol and water, to the coolant cavity.

In some examples, the disclosure describes a method for cooling a rotary mechanical system that includes operating an electric machine of the rotary mechanical system. The rotary mechanical system includes a housing defining at least one electrical cavity housing one or more electrical components and a coolant cavity configured to receive a liquid coolant from a liquid coolant system. The method includes removing heat from the one or more electrical components using a two-phase refrigerant sealed within the electrical cavity and a liquid coolant supplied to the coolant cavity.

The details of one or more examples are set forth in the accompanying drawings and the description below. Other features, objects, and advantages will be apparent from the description and drawings, and from the claims.

BRIEF DESCRIPTION OF THE FIGURES

The details of one or more examples are set forth in the accompanying drawings and the description below. Other features, objects, and advantages will be apparent from the description and drawings, and from the claims.

DETAILED DESCRIPTION

In general, this disclosure describes use of a sealed, two-phase refrigerant to transfer heat from one or more electrical components of an electric machine to a housing of the electric machine. Electric machines (e.g., electric power generators and electric motors) may generate large amounts of heat during power generation or conversion. For example, various electrical components, such as stator windings and control electronics, may receive electrical current and generate or control generation of electromagnetic forces using the electrical current.

Cooling media with advantageous thermal properties, such as high heat capacity and thermal conductivity, are typically ionic fluids that cannot directly contact and remove heat from the electrical components of an electric machine. Instead, the electrical components may be coupled to the housing of the electric machine to conductively transfer heat through the housing to a cooling medium in a cooling jacket. However, various portions of the electrical components that are not near the housing or the cooling jacket may not be effectively cooled by the cooling media. As an alternative, non-ionic cooling media may be circulated through the housing of the electric machine. However, such non-ionic cooling media may have less advantageous thermal properties and require a larger, heavier system for conditioning the non-ionic cooling media, such as a larger heat exchanger or a higher volume piping system.

According to various systems and techniques of the present disclosure, a rotary mechanical system may be configured to use an ionic cooling medium to remove heat from electrical components of an electric machine while still providing adequate cooling to components having a relatively long thermal conductive path to the housing of the electrical machine. A housing of the rotary mechanical system including an electric machine may cool electrical components within the housing, such as a stator, using a liquid coolant circulated through a coolant cavity of the housing. The liquid coolant may remove heat from the housing without directly contacting the electrical components, and may be especially effective at removing heat from electrical components in thermal contact with a wall of an electrical cavity. For example, electrical components generating a large amount of heat may be directly coupled to the wall of the electrical cavity to improve transfer of heat to the liquid coolant.

To aid heat transfer from the various portions of the electrical components that are not near the housing, the housing may include one or more component cavities that include a two-phase refrigerant sealed within the component cavities. The refrigerant transfers heat from one or more electrical components within a component cavity to the wall of the component cavities, such as through convection of a liquid phase of the refrigerant and/or through evaporation and subsequent condensation of a vapor phase of the refrigerant against the wall of the electrical cavity or another cool surface coupled to the electrical cavity, such as a fin. This transferred heat may be removed from the housing by transferring heat to a liquid coolant or discharging the heat to an ambient environment of the electric machine. In this way, rotary mechanical systems described herein may enable the use of higher heat capacity ionic cooling media, such as water-glycol, and increase heat transfer to the liquid cooling system, permitting higher power density in the electric machine and lower operating temperature.

Figure 1A:
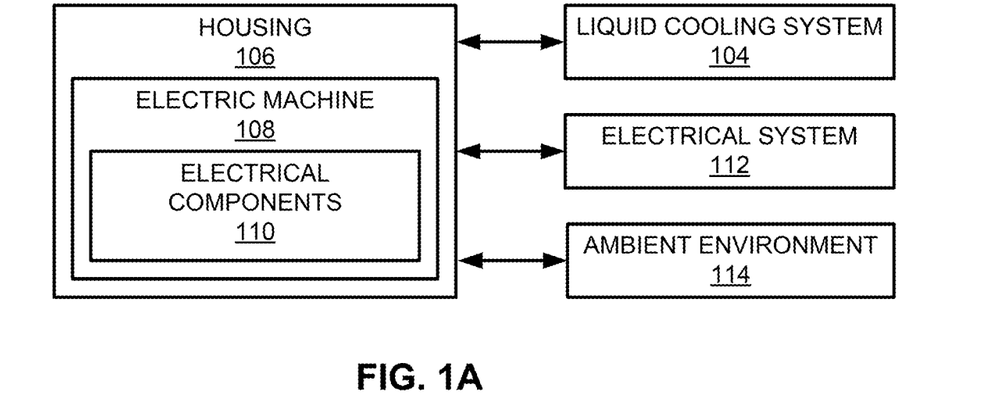
FIG. 1A is a schematic block diagram of an example mechanical and cooling system 100.

FIG. 1A is a schematic block diagram of an example mechanical and cooling system 100. Mechanical and cooling system 100 includes a rotary mechanical system 102 and a liquid cooling system 104 fluidically coupled to rotary mechanical system 102.

Rotary mechanical system 102 is electrically coupled to an electrical system 112, such as by wiring or another electrical conduit. Rotary mechanical system 102 includes an electric machine 108, one or more electrical components 110, and a housing 106 housing at least a portion of electric machine 108 and electrical components 110. In examples in which electric machine 108 is an electric motor, electrical system 112 may supply electrical current to electric machine 108, while in examples in which electric machine 108 is an electric generator, electrical system 112 may receive electrical current generated by electric machine 108. Regardless, electric machine 108 may include one or more electrical components 110 configured to receive electrical current from electrical system 112 and use the electrical current to control electromagnetic forces used for electromechanical conversion by electric machine 108.

Liquid cooling system 104 may be fluidically coupled to housing 106, such as by piping or another fluid conduit. Liquid cooling system 104 may be configured to supply a liquid coolant to housing 106 to remove heat from housing 106 and components of rotary mechanical system 102 within housing 106. For example, liquid cooling system 104 may be configured to circulate the liquid coolant between housing 106 and one or more heat exchangers, and condition and supply the liquid coolant to remove heat from housing 106 at a particular rate.

Liquid cooling system 104 may be configured to supply an ionic liquid coolant. An ionic liquid coolant may have a relatively high heat capacity (e.g., greater than 3 KJ/kg·° C.) for absorbing heat and a relatively high thermal conductivity (e.g., greater than 0.2 W/m·K) for transferring heat. In some examples, the liquid coolant of liquid cooling system 104 includes ethylene glycol and water, such as in a volume ratio between about 80:20 and about 20:80.

Housing 106 may be positioned within an ambient environment 114 of a vehicle, such as an unpressurized chassis of an aircraft. During operation of electric machine 108, a temperature of ambient environment 114 may be substantially lower than a temperature of housing 106 of rotary mechanical system 102. For example, ambient environment 114 may be supplied with ram air or other low temperature, high volume medium that contacts an outer surface of housing 106.

Figure 1B:
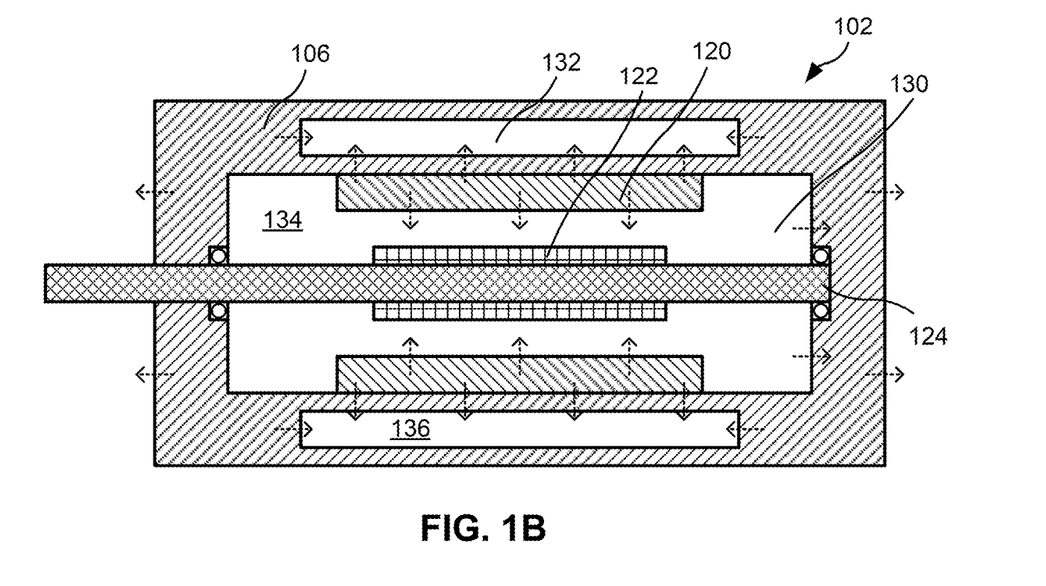
FIG. 1B is a cross-section side view diagram illustrating the example rotary mechanical system of the example mechanical and cooling system of FIG. 1A.

Housing 106 may be configured to use both a circulated liquid coolant and a sealed two-phase refrigerant to remove heat from components of electric machine 108. FIG. 1B is a cross-section side view diagram along a rotational axis illustrating the example rotary mechanical system 102 of the example mechanical and cooling system 100 of FIG. 1A. In the example of FIG. 1B, rotary mechanical system 102 includes electric machine 108 that includes a stator 120, a rotor 122, and a shaft 124 attached to rotor 122. In the example electric machine 108 of FIG. 1B, stator 120 may generate a magnetic field that interacts with an electrical current in windings of rotor 122 to generate an electromotive force on rotor 122 and, correspondingly, shaft 124.

Housing 106 defines one or more component cavities each configured to house one or more components of electric machine 108 and other components and/or media of rotary mechanical system 102. In the example of FIG. 1B, housing 106 includes an electrical cavity 130 and a coolant cavity 132; however, in other examples, housing 106 may include additional cavities, and either of electrical cavity 130 or coolant cavity 132 may include more than one cavity. The one or more component cavities are at least partially formed by a wall of housing 106 and include various exposed surfaces of the wall of housing 106.

Electrical cavity 130 is configured to house one or more electrical components of electric machine 108. In the example of FIG. 1B, the one or more electrical components housed by electrical cavity 130 includes stator 120; however, in other examples, the one or more electrical components may include a controller or other electrical equipment or electronics associated with operation of electric machine 108. Electrical cavity 130 includes one or more surfaces configured to mount the electrical components 110, such as stator 120, such that electrical components 110 are coupled to a wall of housing 106 and in thermal communication with housing 106. For example, stator 120 may be mounted on an inner surface of the wall of housing 106 in electrical cavity 130, such that heat generated during operation of stator 120 may be transferred to housing 106 through conduction.

Coolant cavity 132 is configured to receive a liquid coolant 136 from a liquid coolant system, such as liquid cooling system 104 of FIG. 1A, and guide liquid coolant 136 through housing 106. While illustrated as a single open cavity, coolant cavity 132 may include cavities in a variety of configurations, such as coolant channels that run axially or circumferentially around or along housing 106. In some examples, coolant cavity 132 may substantially surround electric machine 108 and/or electrical cavity 130. While coolant cavity 132 is illustrated as being integral with other portions of housing 106, in other examples, coolant cavity 132 may be separate from other portions of housing 106. For example, housing 106 may include an electric machine housing that includes electrical cavity 130, an impeller housing that includes an output of shaft 124, and a cooling jacket that surrounds the electric machine housing and defines coolant cavity 132.

During power generation, electrical components 110 of electric machine 108 in electrical cavity 130, such as electromagnetic windings of stator 120 and conductive windings of rotor 122, and mechanical components, such as bearings, may generate substantial amounts of heat. Electrical components 110 that are coupled to an inner surface of a wall of electrical cavity 130 such as stator 120 in FIG. 1B may transfer at least a portion of the generated heat to housing 106 through conduction. While a portion of the heat transferred to housing 106 may discharge to ambient environment 114 external to housing 106, such ambient heat losses may not be sufficient to maintain components of electric machine 108 below a desired temperature. Coolant cavity 132 may be configured to remove heat from housing 106 by transferring at least a portion of the heat from housing 106 to the liquid coolant in coolant cavity 132. The substantially higher heat transfer properties of the liquid coolant, such as specific heat and thermal conductivity, compared to ambient air may enable a greater amount of heat to be removed from housing 106 compared to a system that does not include coolant cavity 132.

To further enhance heat removal and provide direct cooling to these components, coolant cavity 132 may share at least one wall with electrical cavity 130, such that electrical cavity 130 is in relatively high thermal communication with coolant cavity 132. The shared wall may have a thickness that is substantially small to increase heat flux from the electrical components through the shared wall to the liquid coolant of coolant cavity 130. In some examples, the shared wall includes at least 30 percent of a surface area of an inner surface of electrical cavity 130.

While the liquid coolant of coolant cavity 132 may remove heat transferred to housing 106 by electrical components in close contact with an inner surface of electrical cavity 132, other electrical components or portions of electrical components may be further from coolant cavity 132. To further enhance heat removal from electrical components within electrical cavity 130, housing 106 is configured to seal a two-phase refrigerant 134 within electrical cavity 130. Refrigerant 134 may enhance heat removal between electrical components, such as radially inward surfaces of stator 120, and various heat-generating mechanical components, such as bearings, to housing 106.

Refrigerant 134 may be configured to operate as a two-phase refrigerant within the operating conditions of electric machine 108 and at a relatively low pressure. For example, refrigerant 134 may have a critical temperature greater than about 150 degrees Celsius (° C.), a critical pressure less than about 50 MPa, and/or a freezing temperature less than about negative (−)100° C. In some examples, refrigerant 134 includes at least one of HFO-1233zd, R-1233zd, R-112, or R-123. Refrigerant 134 may be maintained within electrical cavity 130 as a two-phase refrigerant. For example, as refrigerant 134 is heated, a volume fraction of refrigerant 134 as a vapor may increase within electrical cavity 130 and, correspondingly, a pressure may increase within electrical cavity 130, thereby counteracting the increase in vapor fraction. To improve heat transfer of refrigerant 134, the volume fraction of refrigerant 134 as a liquid may be relatively high, as the liquid may be configured to transfer heat at a higher rate than a vapor.

Figure 1C:
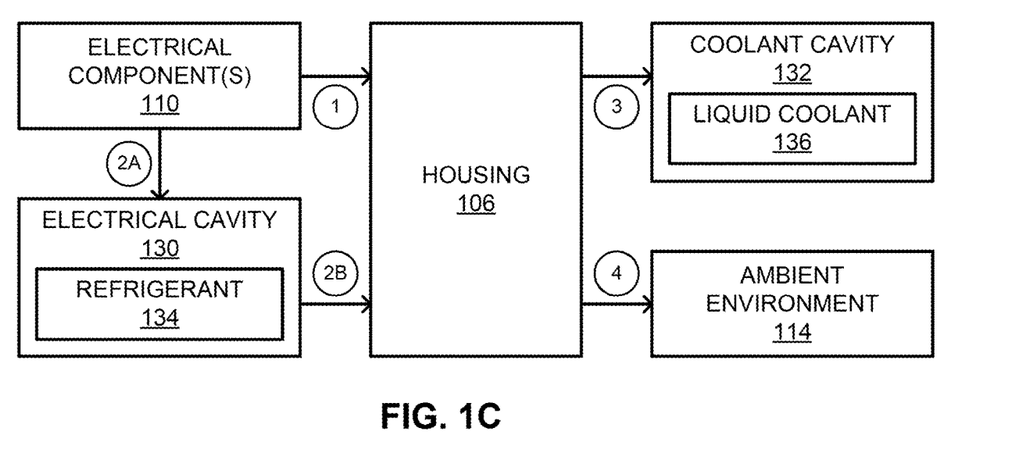
FIG. 1C is a schematic block diagram of heat transfer paths from electrical components of the example rotary mechanical system of FIG. 1B.

As mentioned above, housing 106 may define various heat transfer paths for removing heat from electrical components 110. FIG. 1C is a schematic block diagram of heat transfer paths from electrical components 110 of the example rotary mechanical system 102 of FIG. 1B to an external environment of rotary mechanical system 102, such as an ambient environment 138 or a liquid cooling system, such as liquid cooling system 104 of FIG. 1A.

In some examples, such as examples in which housing 106 physically supports or is attached to one or more electrical components 110, housing 106 may define a first heat transfer path (1) from one or more electrical components 110 to housing 106. For example, electrical components 110 coupled to housing 106 may transfer heat through conduction to a wall of housing 106, such as to the shared wall between coolant cavity 132 and electrical cavity 130. The first heat transfer path may remove a substantial amount of heat from portions of electrical components 110 near to the wall of housing 106. A variety of parameters of system 102 may be configured to improve heat transfer along the first heat transfer path including, but not limited to, increasing a surface area of electrical components 110 in contact with a wall of electrical cavity 130, increasing thermal transfer medium between electrical components 110 and housing 106, and other parameters that may increase conduction between electrical components 110 and housing 106.

Housing 106 defines a second heat transfer path (2A and 2B) from one or more electrical components 110 to refrigerant 134 in electrical cavity 130 and from refrigerant 134 in electrical cavity 130 to housing 106, such as to an inner surface of a wall defining electrical cavity 130. For example, surfaces of electrical components 110 exposed to refrigerant 134 in electrical cavity 130 may transfer heat to refrigerant 134. Some electrical components 110, such as electrical components near a bottom of electrical cavity 130, may transfer heat to refrigerant 134 in a liquid phase, while other electrical components 110, such as electrical components near a top of electrical cavity 130, may transfer heat to refrigerant 134 in a vapor phase. A variety of parameters of system 102 may be configured to improve transfer of heat from electrical components 110 to refrigerant 134 including, but not limited to, selecting refrigerant 134 having high thermal properties, such as specific heat, thermal conductivity, and latent heat of vaporization, increasing a phase composition of liquid refrigerant 134, increasing a surface area of electrical components 110 or heat sinks coupled to electrical components 110, and other parameters that may improve transfer of heat from electrical components 110 into refrigerant 134.

Heated refrigerant 134 may transfer at least a portion of the heat to housing 106. A surface area of electrical cavity 130 for heat transfer may be relatively large, such that a large amount of heat may be distributed from refrigerant 134 to housing 106 in a relatively even distribution. A variety of parameters of system 102 may be configured to improve transfer of heat from refrigerant 134 to housing 106 including, but not limited to, increasing a surface area of electrical cavity 130 (e.g., with cooling fins), increasing a phase composition of liquid refrigerant 134, and other parameters that may improve transfer of heat from refrigerant 134 to housing 106.

One such parameter—a Nusselt number (Nu) of refrigerant 134 sealed within housing 106—may be increased to improve heat removal from electrical components 110. The Nusselt number may represent a ratio of convective heat transfer to conductive heat transfer, and may be proportional to a convective heat transfer coefficient of refrigerant and a characteristic length of electrical cavity 130 (for average Nusselt number; for local Nusselt number, distance from component to wall of coolant cavity 130), and inversely proportional to thermal conductivity of refrigerant 134. By increasing various parameters that increase the convective heat transfer coefficient and the characteristic length, such as turbulent flow of refrigerant 134, a surface area of electrical cavity 130, or a ratio of volume to surface area, the amount of heat removed by refrigerant 134 may be increased.

Depending on a physical (e.g., contact) or spatial (e.g., distance) relationship of electrical components 110 to a wall of electrical cavity 130 and/or coolant cavity 132, particular electrical components 110 may discharge different amounts of heat through the first and second heat transfer paths. For example, portions of electrical components 110 attached to the wall of electrical cavity 130 and/or in close proximity to coolant cavity 132 may have a relatively large amount of heat discharged through the first heat transfer path and a relatively small amount of heat discharged through the second heat transfer path. In contrast, portions of electrical components 110 that are not attached to the wall of electrical cavity 130 or are located at a greater distance from the wall of electrical cavity 130 may have a relatively small or negligible amount of heat discharged through the first heat transfer path and a relatively large amount of heat discharged through the second heat transfer path.

In some examples, such as examples in which housing 106 includes coolant cavity 132 or another coolant structure (e.g., cooling jacket) thermally coupled to housing 106, housing 106 may define a third heat transfer path (3) from housing 106 to liquid coolant 136 in coolant cavity 132. For example, coolant cavity 132 may have a relatively large surface area, such that liquid coolant 136 flowing through coolant cavity 132 may remove a substantial amount of heat from housing 106. Heated liquid coolant 136 may be circulated to liquid cooling system 104 of FIG. 1A. While described as a liquid coolant, in some examples, liquid coolant 136 may be a two-phase coolant that includes a gaseous phase. A variety of parameters of system 102 may be configured to improve transfer of heat from housing 106 into liquid coolant 136 including, but not limited to, reducing a thickness of a wall between electrical cavity 130 and coolant cavity 132, increasing a surface area of coolant cavity 132, selecting liquid coolant 136 having high thermal properties, such as specific heat and thermal conductivity, increasing operating parameters of liquid coolant 136, such as temperature differential (e.g., reduced temperature of liquid coolant 136) and flow rate, and other parameters that may improve heat transfer from housing 106 to liquid coolant 136.

Housing 106 defines a fourth heat transfer path (4) from housing 106 to ambient environment 138, such as from an outer surface of a wall of housing 106. For example, housing 106 may have a high surface area exposed to ambient environment 138. Ambient environment 138 may have a lower temperature than housing 106, such that heat may transfer from housing 106 to a medium within ambient environment, such as air. In some examples, this heat transfer may be aided by convective flow of the medium in ambient environment 138. A variety of parameters of system 102 may be configured to improve heat transfer from housing 106 to ambient environment 138 including, but not limited to, increased surface area of an outer surface of housing 106, including heat sinks or baffles, increased flow rate of a convective medium around housing 106, such as cooling air, reduced temperature of the convective medium around housing 106, and other parameters that may improve heat transfer from housing 106 to ambient environment 138.

Figure 2:
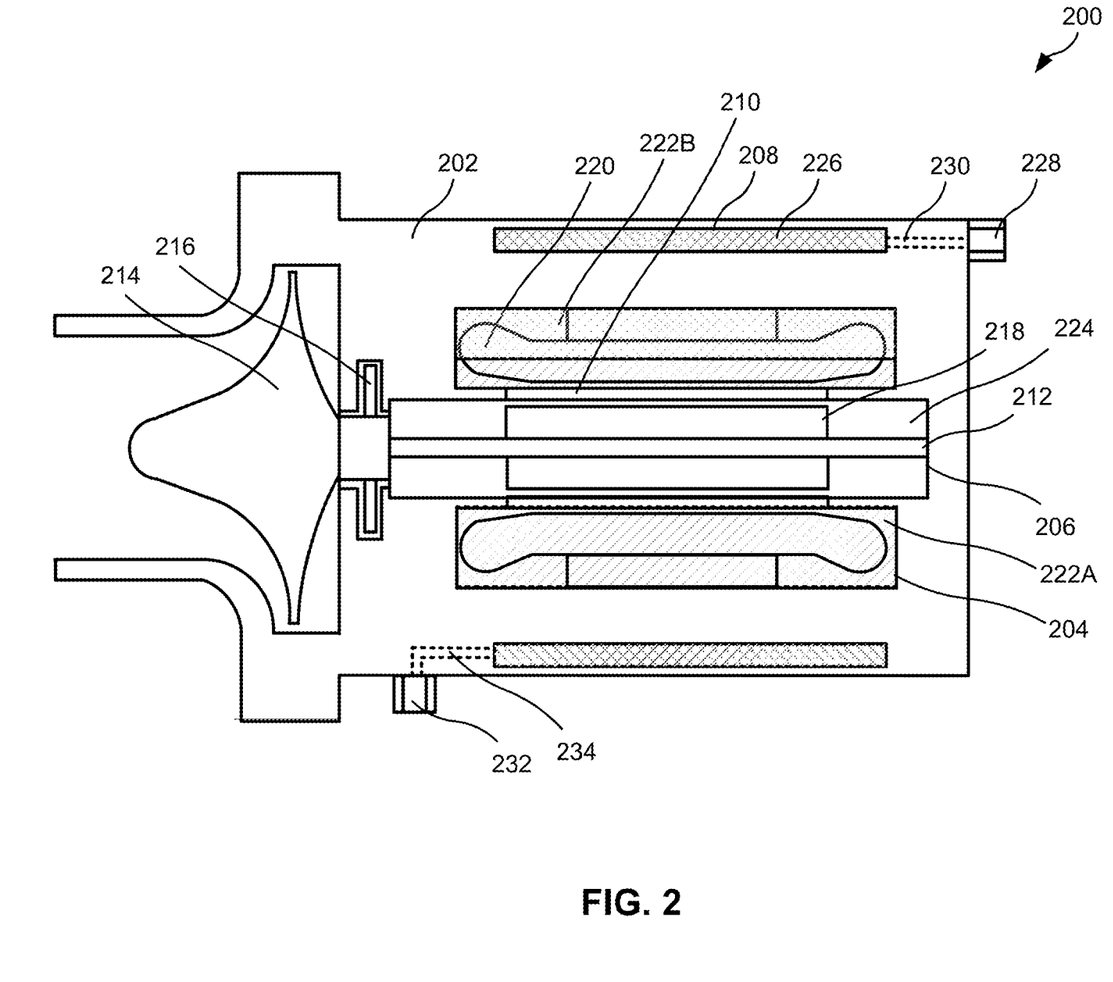
FIG. 2 is a cross-section side view diagram illustrating an example rotary mechanical system.

Systems described herein may include a housing that is further differentiated between an electrical cavity having stationary components cooled by a two-phase refrigerant and an electrical cavity having moving components cooled by a low density gaseous medium. FIG. 2 is a cross-section side view diagram illustrating an example rotary mechanical system 200. In the example of FIG. 2, rotary mechanical system 200 is illustrated as a compressor that includes components of an electric motor. Rotary mechanical system 200 includes a shaft 212, one or more bearings 216 (e.g., illustrated as a journal bearing) coupled to shaft 212, and an impeller assembly 214 coupled to shaft 210. Shaft 212 may be configured to rotate within housing 202 supported by bearings 216. Impeller 214 may be configured to receive mechanical energy from shaft 212 and use the mechanical energy to compress a fluid, such as a refrigerant, and discharge the pressurized fluid to another component or system. The electric machine of rotary mechanical system 200 may include a rotor 218 coupled to shaft 212 and a stator 220 coupled to housing 202. Stator 220 may generate a magnetic field that interacts with an electrical current in windings of rotor 218 to generate an electromotive force on rotor 218 and, correspondingly, shaft 212.

Housing 202 defines one or more component cavities, including a stator cavity 204 housing stator 220, a rotor cavity 206 housing rotor 218 and a portion of shaft 212, and coolant cavity 208. In the example of FIG. 2, stator 220 is coupled to an inner surface of stator cavity 204, such as by a mount or thermal medium. Stator cavity 204 includes a sealed two-phase refrigerant 222. During operation, two-phase refrigerant 222 is present as a liquid refrigerant 222A in a liquid phase and a vapor refrigerant 222B in a vapor phase. Liquid refrigerant 222A and vapor refrigerant may be present at an equilibrium depending on a pressure and temperature within stator cavity 204. Stator cavity 204 and rotor cavity 206 are separated by a bore seal 210. Bore seal 210 may be configured to seal refrigerant 222 from rotor cavity 206. In some examples, such as shown in FIG. 2, stator 220 may be coupled to an inner surface of a shared wall between coolant cavity 208 and stator cavity 204.

Rotor 218 may include windings or other electrical components that produce heat. To cool rotor 218, rotor cavity 206 may be configured to receive a cooling gas 224 from impeller assembly 214. For example, impeller assembly 214 may axially discharge a small amount of compressed fluid around bearings 216 into rotor cavity 206. The compressed fluid may provide cooling to bearings 216, rotor 218, and a portion of shaft 212.

Coolant cavity 208 is configured to receive a liquid coolant from a liquid coolant system, such as liquid cooling system 104 of FIG. 1A. Coolant cavity 208 may be fluidically coupled to a coolant inlet 228 through an inlet channel 230 and a coolant outlet 232 through an outlet channel 234. In the example of FIG. 2, liquid coolant 226 may be configured to flow axially through coolant cavity 208; however, in other configurations, liquid coolant 226 may flow in other directions, including circumferentially. Coolant cavity 208 shares a wall with stator cavity 204.

During operation, housing 202 defines a first heat transfer path for directly transferring heat from stator 206 to housing 202 through conduction and a second heat transfer path for indirectly transferring heat from stator 220 to liquid coolant 226 via refrigerant 222 through convection. The first heat transfer path is from stator 220 to the shared wall between coolant cavity 208 and stator cavity 204 and to liquid coolant 226 in coolant cavity 208. The second heat transfer path is from stator 220 to refrigerant 222 in stator cavity 204. As shown in FIG. 2, refrigerant 222 may include a liquid refrigerant 222A and a vapor refrigerant 222B. A volume fraction of liquid refrigerant 222A and vapor refrigerant 222B may change during operation of system 200. For example, liquid refrigerant 222A contacting stator 220 may vaporize. This vaporized heat may transfer heat to liquid refrigerant 222A or collect as vapor refrigerant 222B to condense on cooling portions of housing 202, such as an inner surface of stator cavity 204 or one or more heat sink structures within stator cavity 204. While a relatively high volume fraction of refrigerant 222 within stator cavity 204 may be liquid refrigerant 222A, at least a portion of refrigerant 222 may be vapor refrigerant 222B to permit thermal expansion of liquid refrigerant 222A.

Figure 3:
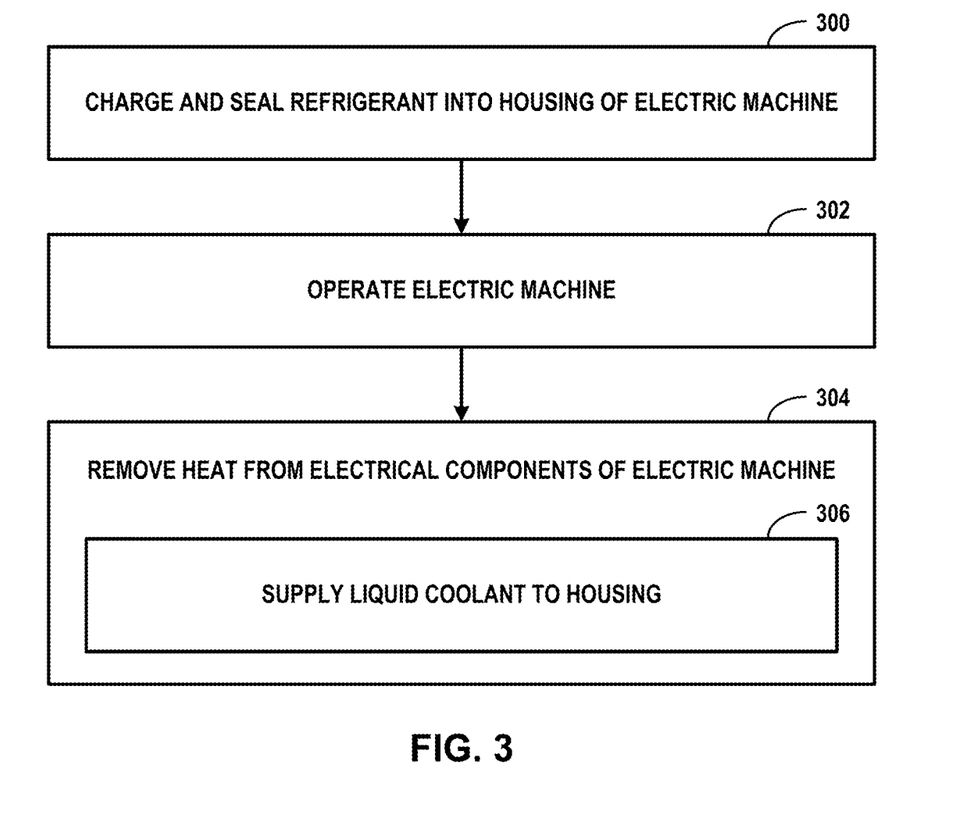
FIG. 3 is a flowchart of an example technique for assembling and operating a rotary mechanical system.

FIG. 3 is a flowchart of an example technique for assembling and operating a rotary mechanical system as described herein. The method of FIG. 3 will be described with respect to system 100 of FIGS. 1A-C; however, the method of FIG. 3 may be used with other rotary mechanical systems, such as rotary mechanical system 200 of FIG. 2.

In some examples, the method of FIG. 3 includes charging refrigerant 134 into electrical cavity 130 of housing 106 (300). Refrigerant 134 may be charged to an amount and pressure, such that at least a portion of refrigerant 134 may be in a liquid phase under normal operating conditions of rotary mechanical system 102. In some examples, refrigerant 134 in a liquid phase may occupy at least 50% of a volume fraction of refrigerant 134 across an operating range of electric machine 108, while refrigerant in a vapor phase may occupy at least 10 vol. % of a volume fraction of refrigerant across the operating range of electric machine 108.

The method of FIG. 3 includes operating electric machine 108 (302). As electric machine operates, electrical components 110 may generate heat. The method of FIG. 3 includes removing heat from the one or more electrical components 110 of electric machine 108 (304). Rotary mechanical system 102 may remove a first portion of the heat along a first heat transfer path from at least one electrical component 110 to the shared wall between coolant cavity 132, and may remove a second portion of the heat along a second heat transfer path from one or more electrical components 110 to refrigerant 124 in electrical cavity 130. For example, rotary mechanical system 102 may remove heat from stator 120 by thermal conduction to housing 106 and by thermal convection to refrigerant 134 in electrical cavity 130 and from electrical cavity 130 to housing 106.

The heat transferred to housing 106 may further be removed from housing 106. In some examples, liquid cooling system 104 may actively remove heat from housing 102. For example, liquid cooling system 104 may be operated to supply liquid coolant to coolant cavity 132 to remove heat from housing 106, such as according to a particular flow rate or temperature differential. In some examples, ambient environment 114 may actively and/or passively remove heat from housing 102. For example, a convective source may be operated to control a temperature of a cooling medium, such as ram air, to remove heat from an outer surface of housing 106.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), ASICs, FPGAs, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Select examples of the present disclosure include, but are not limited to, the following examples.

Example 1: A rotary mechanical system includes an electric machine; and a housing at least partially enclosing one or more components of the electric machine, the housing defining: an electrical cavity housing one or more electrical components; and a coolant cavity configured to receive a liquid coolant from a liquid coolant system, wherein the housing is configured to seal a two-phase refrigerant within the electrical cavity.

Example 2: The rotary mechanical system of example 1, wherein the coolant cavity shares a wall with the electrical cavity.

Example 3: The rotary mechanical system of example 2, wherein at least one electrical component of the one or more electrical components is attached to an inner surface of the shared wall between the coolant cavity and the electrical cavity.

Example 4: The rotary mechanical system of any of examples 2 and 3, wherein the housing defines: a first heat transfer path from the at least one electrical component to the shared wall between the coolant cavity and the electrical cavity and to the liquid coolant in the coolant cavity; and a second heat transfer path from the one or more electrical components to the refrigerant in the electrical cavity.

Example 5: The rotary mechanical system of any of examples 1 through 4, wherein the electric machine comprises a rotor and a stator surrounding the rotor, and wherein the stator is attached to an inner surface of the electrical cavity.

Example 6: The rotary mechanical system of example 5, wherein the electrical cavity comprises a stator cavity housing the stator, and wherein the housing further defines a rotor cavity housing the rotor.

Example 7: The rotary mechanical system of example 6, wherein the housing includes a bore seal between the rotor cavity and the stator cavity configured to seal the refrigerant from the rotor cavity.

Example 8: The rotary mechanical system of any of examples 5 through 7, wherein the rotary mechanical system comprises a compressor, and wherein the rotor is mechanically coupled to an impeller assembly.

Example 9: The rotary mechanical system of example 8, wherein the rotor cavity is configured to receive a cooling gas from the impeller assembly.

Example 10: The rotary mechanical system of any of examples 1 through 9, further comprising the two-phase refrigerant sealed within the electrical cavity.

Example 12: The mechanical and cooling system of example 11, wherein the liquid coolant comprises ethylene glycol and water.

Example 13: The mechanical and cooling system of example 11, wherein the electric machine comprises a rotor and a stator surrounding the rotor, wherein the electrical cavity comprises a stator cavity housing the stator, wherein the stator is coupled to an inner surface of the stator cavity, and wherein the housing further defines a rotor cavity housing the rotor.

Example 14: A method for cooling a mechanical and cooling system includes operating an electric machine of a rotary mechanical system, wherein the rotary mechanical system includes a housing at least partially enclosing one or more components of the electric machine, the housing defining: an electrical cavity housing one or more electrical components; and a coolant cavity; and removing heat from the one or more electrical components using: a two-phase refrigerant sealed within the electrical cavity; and a liquid coolant supplied to the coolant cavity.

Example 15: The method of example 14, wherein removing the heat from the one or more electrical components comprises: removing a first portion of the heat along a first heat transfer path from the at least one electrical component to the shared wall between the coolant cavity and the electrical cavity and to the liquid coolant in the coolant cavity; and removing a second portion of the heat along a second heat transfer path from the one or more electrical components to the refrigerant in the electrical cavity.

Example 16: The method of example 14, wherein removing the heat from the one or more electrical components comprises operating a liquid cooling system fluidically coupled to the coolant cavity to supply the liquid coolant to the coolant cavity, and wherein removing the heat from the one or more electrical components comprises operating a liquid cooling system fluidically coupled to the coolant cavity to supply the liquid coolant to the coolant cavity.

Example 17: The method of any of examples 14 and 15, further comprising charging the refrigerant into the electrical cavity.

Example 18: The method of any of examples 14 through 16, wherein the liquid coolant comprises ethylene glycol and water, and wherein the refrigerant comprises at least one of HFO-1233zd, R-1233zd, R-112, or R-123.

Example 19: The method of any of examples 14 through 17, wherein the refrigerant has a critical temperature greater than about 150° C., a critical pressure less than about 50 MPa, and a freezing temperature less than about −100° C.

Example 20: The method of any of examples 14 through 18, wherein the electric machine comprises a rotor and a stator surrounding the rotor, wherein the electrical cavity comprises a stator cavity housing the stator, wherein the stator is coupled to an inner surface of the stator cavity, and wherein the housing further defines a rotor cavity housing the rotor.

What is claimed is:

1. A rotary mechanical system, comprising:
   an electric machine comprising a rotor and a stator surrounding the rotor, wherein the rotor is mechanically coupled to an impeller assembly; and
   a housing at least partially enclosing one or more components of the electric machine, the housing defining:
      an electrical cavity housing one or more electrical components, wherein the electrical cavity comprises a stator cavity housing the stator and a rotor cavity housing the rotor; and
      a coolant cavity configured to receive a liquid coolant from a liquid coolant system,
      wherein the stator is attached to an inner surface of the stator cavity,
      wherein the housing is configured to seal a two-phase refrigerant within the stator cavity,
      wherein the rotor cavity is configured to receive a cooling gas from the impeller assembly, and
      wherein the housing includes a bore seal between the rotor cavity and the stator cavity configured to seal the refrigerant from the rotor cavity.

2. The rotary mechanical system of claim 1, wherein the coolant cavity shares a wall with the electrical cavity.

3. The rotary mechanical system of claim 2, wherein at least one electrical component of the one or more electrical components is attached to an inner surface of the shared wall between the coolant cavity and the electrical cavity.

4. The rotary mechanical system of claim 2, wherein the housing defines:
   a first heat transfer path from the at least one electrical component to the shared wall between the coolant cavity and the electrical cavity and to the liquid coolant in the coolant cavity; and
   a second heat transfer path from the one or more electrical components to the refrigerant in the electrical cavity.

5. The rotary mechanical system of claim 1, wherein the rotary mechanical system comprises a compressor.

6. The rotary mechanical system of claim 1, further comprising the two-phase refrigerant sealed within the electrical cavity.

7. The rotary mechanical system of claim 1, wherein at least 50 volume percent (vol. %) of a volume fraction of the refrigerant within the electrical cavity is in a liquid phase and at least 10 vol. % of the volume fraction of the refrigerant within the electrical cavity is in a vapor phase across an operating range of the electric machine.

8. A mechanical and cooling system, comprising;
a rotary mechanical system, comprising:
- an electric machine comprising a rotor and a stator surrounding the rotor, wherein the rotor is mechanically coupled to an impeller assembly; and
- a housing at least partially enclosing one or more components of the electric machine, the housing defining:
  - an electrical cavity housing one or more electrical components, wherein the electrical cavity comprises a stator cavity housing the stator and a rotor cavity housing the rotor; and
  - a coolant cavity configured to receive a liquid coolant,
  - wherein the stator is attached to an inner surface of the stator cavity,
  - wherein the housing includes a two-phase refrigerant sealed within the stator cavity,
  - wherein the rotor cavity is configured to receive a cooling gas from the impeller assembly, and
  - wherein the housing includes a bore seal between the rotor cavity and the stator cavity configured to seal the refrigerant from the rotor cavity; and
- a liquid cooling system fluidically coupled to the coolant cavity and configured to supply the liquid coolant to the coolant cavity.

9. The mechanical and cooling system of claim 8, wherein the liquid coolant comprises ethylene glycol and water.

10. A method for cooling a mechanical and cooling system, comprising:
- operating an electric machine of a rotary mechanical system, wherein the electric machine comprises a rotor and a stator surrounding the rotor, wherein the rotor is mechanically coupled to an impeller assembly, and wherein the rotary mechanical system includes a housing at least partially enclosing one or more components of the electric machine, the housing defining:
  - an electrical cavity housing one or more electrical components, wherein the electrical cavity comprises a stator cavity housing the stator and a rotor cavity housing the rotor, and wherein the stator is attached to an inner surface of the stator cavity; and
  - a coolant cavity configured to receive a liquid coolant; and
- removing heat from the one or more electrical components using:
  - a two-phase refrigerant sealed within the stator cavity, wherein the housing includes a bore seal between the rotor cavity and the stator cavity configured to seal the refrigerant from the rotor cavity;
  - a cooling gas received by the rotor cavity from the impeller assembly, and
  - a liquid coolant supplied to the coolant cavity.

11. The method of claim 10,
wherein the coolant cavity shares a wall with the electrical cavity, and
wherein removing the heat from the one or more electrical components comprises:
- removing a first portion of the heat along a first heat transfer path from the at least one electrical component to the shared wall between the coolant cavity and the electrical cavity and to the liquid coolant in the coolant cavity; and
- removing a second portion of the heat along a second heat transfer path from the one or more electrical components to the refrigerant in the electrical cavity.

12. The method of claim 10, wherein removing the heat from the one or more electrical components comprises operating a liquid cooling system fluidically coupled to the coolant cavity to supply the liquid coolant to the coolant cavity.

13. The method of claim 10, further comprising charging the refrigerant into the stator cavity.

14. The method of claim 10,
wherein the liquid coolant comprises ethylene glycol and water, and
wherein the refrigerant comprises at least one of HFO-1233zd, R-1233zd, R-112, or R-123.

15. The method of claim 10, wherein the refrigerant has a critical temperature greater than 150° C., a critical pressure less than 50 MPa, and a freezing temperature less than −100° C.

* * * * *